United States Patent
Brown

[15] 3,638,075
[45] Jan. 25, 1972

[54] COMMUNICATION LINE RELAY SYSTEM

[72] Inventor: William H. Brown, Mahwah, N.J.

[73] Assignee: The Western Union Telegraph Company, New York, N.Y.

[22] Filed: Nov. 3, 1970

[21] Appl. No.: 86,521

[52] U.S. Cl. ....................................317/148.5 R, 307/231
[51] Int. Cl. ....................................................H01h 47/32
[58] Field of Search ...................317/148.5 R, 149, DIG. 5; 307/231–236

[56] References Cited

UNITED STATES PATENTS

| | | | |
|---|---|---|---|
| 2,874,339 | 2/1959 | Perlman | 317/148.5 R |
| 3,135,896 | 6/1964 | Carter | 317/148.5 R |
| 3,239,723 | 3/1966 | Washington et al. | 317/DIG. 5 |
| 3,293,505 | 12/1966 | Miller | 317/148.5 R |
| 3,465,208 | 9/1969 | Patrickson et al | 317/148.5 R |

*Primary Examiner*—L. T. Hix
*Attorney*—Michael I. Borsella

[57] ABSTRACT

Disclosed is an improved communication line relay system for operating directly from line power including; an input-polarizing bridge circuit, a voltage-regulating circuit including a transistor and zener diode configured to bleed excess line current and to provide a regulated voltage. The system further includes a regenerative bistable circuit having a trigger input connected with the communication line for sensing the state of the received communication signal and a pair of regeneratively coupled transistors connected with the energizing coils of an output bipolar relay to apply the regulated power to the relay and to provide output states of the relay in accordance with the states of the received communication signal.

7 Claims, 1 Drawing Figure

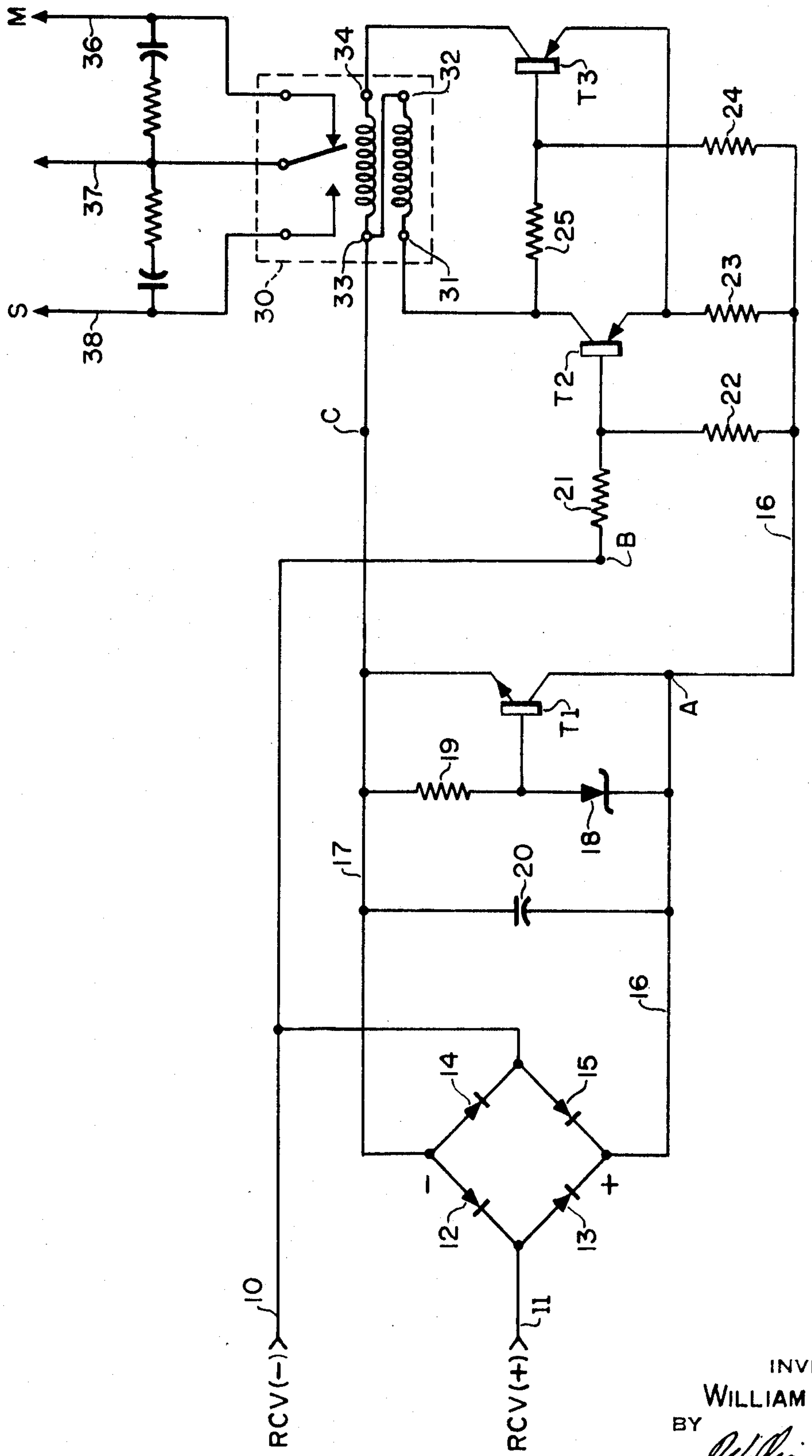
INVENTOR:
WILLIAM H. BROWN.
BY
William A. Speicher [signature]
ATTORNEY.

COMMUNICATION LINE RELAY SYSTEM

BACKGROUND OF THE INVENTION

This invention relates to a communications relay system and more particularly to telegraph line relays.

Telegraph communication usually involves serially transmitting the letters of the alphabet and the various characters over a single circuit by using a simple code such as the ASCII code. The five or seven binary levels of the code are successively transmitted in the form of presence pulses or no pulses. At the receiving terminal the particular arrangement of pulses and no pulses is interpreted as a letter of the alphabet or character transmitted. The presence pulse is usually referred to as a mark and the absence pulse as a space. The receiving facility includes a receive minus terminal and receive plus terminal defining a complete circuit.

Typically, a mark signal is received as a minus 120-volt condition at the receive minus terminal, and a space signal is received as 0 volt. For both signals the voltage at the receive plus terminal is zero. This mode of operation is referred to as unipolar or neutral operation since the voltage variation between the space and mark signals is always on one side of zero. Another mode of operation is referred to as bipolar operation in which the mark signal is received as a negative 120 volts at the receive minus terminal and the space condition is received as a plus 120 volts, while for both signals the receive plus terminal remains at 0 volt.

The two basic modes of operation can be used in connection with various transmission line voltages, the selection of which generally depends upon the nature or type of communication equipment at the transmitting and receiving facilities. Thus, for example, when modems are used transmission is usually in a bipolar mode at plus and minus 12 volts. Also, bipolar plus and minus 24 volts is frequently used. Other possibilities include unipolar and bipolar operation at 65 volts.

The receiving equipment usually includes provisions to accept a relay input in the form of a contact closure or open of one or more contacts to represent the binary states of the transmitted signal. In this way the receiving equipment is isolated from the transmission line. In addition, it is required that the relay system be capable of accurate high-speed performance to handle signals in the area of 200 baud, or bits per second. It is also a requirement that the relay system maintain its output in a predetermined state, such as spacing, when there is no power on the transmission line, i.e., during the absence of transmission and during the receipt of a spacing bit in unipolar operation.

To provide the speed capability prior art relays are usually sensitive high-speed devices. Thus, they are readily susceptible to being overpowered by varying line conditions. Thus, to meet these requirements prior art relay systems usually include a separate supply which biases the output relay toward one predetermined state. A disadvantage of such devices is that they require a different power supply for each line voltage. In the alternate, a bias adjustment feature can be provided by which the relay system can be adjusted each time the line voltage is changed. It can be seen that such prior art relay systems are complicated and require considerable field attention.

The relay system contemplated by the present invention meets all of the aforementioned requirements without necessitating the use of a separate power supply. Thus, it employs a minimum of components and is more economical than prior art devices. It is capable of operating from a variety of line voltages thus avoiding costly field adjustments and provides a sensitive output relay which is itself isolated from line power resulting in enhanced reliability and improved performance.

SUMMARY

One aspect of the present invention resides in the combination of a communication line relay system for converting the binary states of a received signal to corresponding states of at least one relay output circuit, wherein one state of the received binary signal is manifested by a line voltage greater than the voltage associated with the other state of the received signal. The apparatus comprises means including an output relay having an energizing coil and at least one set of output contacts for defining an output circuit capable of assuming two states, e.g., by an open and closed condition of the contacts. The system further includes a voltage-regulating circuit coupled with the communication line for providing a regulated voltage from the received binary signal. The voltage is controlled at a level not exceeding a predetermined safe voltage for the operation of the relay. The apparatus further comprises, means including a bistable circuit having one input connected with the voltage regulating circuit, an output coupled with the energizing coil of the relay for applying current to the coil from the voltage regulating circuit, and a trigger input. The latter is coupled with the communication line for sensing the state of the received binary signal and for triggering the bistable circuit to energize the relay coil to provide the first state of its contacts when the received signal is in its first state, and for deenergizing the relay coil to provide the second state of the contacts when the received signal is in its second state.

In accordance with a preferred aspect of the present invention a polarizing bridge circuit is included to apply the received signal to the voltage-regulating circuit with a given polarity. Also, in accordance with this aspect the regulating circuit includes a transistor and a zener diode connected with the transistor to provide a fixed voltage of the collector above the base. The transistor is connected across the polarizing bridge so that it bleeds excess received current and due to the action of the zener diode provides a fixed voltage at its output. Thus, the relay system can be applied to various line voltages and modes of operations.

In accordance with yet a further aspect of the invention a sensitive bipolar output relay is provided having two actuating coils each respectively driven by one of two transistors provided in the aforementioned bistable circuit wherein the transistors are regeneratively coupled. Two positive contact closure states are provided. A first is by operation of the first coil of the output relay representing the first state of the received binary signal. A second is by operation of the second coil of the output relay in response to the second state of the received signal. Thus, positive operation is provided with complete isolation of the bipolar relay output from the incoming communication line.

In view of the foregoing it is an object of the present invention to provide a reliable communication line relay system.

Another object of the invention is to provide a communication line relay system capable of operating from the received signal without necessitating a separate power supply.

A further object of the invention is to provide a relay system capable of operating from the communication line power at various voltages and modes of operation including bipolar and unipolar modes.

It is another object of the invention to provide a communication line relay system employing DC circuit elements whereby the output contacts of the relay are precluding from banking to one state or the other due to ambiguous line conditions.

Yet a further object of the invention is to provide a communication line relay system which is capable of meeting varying line voltages without requiring a bias adjustment.

Another object of the invention is to provide a relay system capable of operation at various line voltages without requiring input current adjustments.

It is yet another object of the invention to provide a communication line relay system which provides for total isolation between its output and input without requiring a power supply separate from the communication line.

It is yet a further object of the invention to provide a communication line relay system which isolates the sensitive output relay from any line surges thereby avoiding the possibility of damage.

These and other objects, advantages and features of the present invention will be more fully understood by referring to the following descriptions and claims taken in conjunction with accompanying drawing.

DESCRIPTION OF THE PREFERRED EMBODIMENT

Referring now to the appended drawing which is a schematic illustration of a relay system in accordance herewith, a receive minus terminal is shown connected with a first conductor 10. A receive plus terminal is shown connected with a conductor 11. The incoming telegraph signal, be it 120-volt bipolar or unipolar, or 65-volt bipolar, or the like, is received across these terminals. The polarity of the incoming signal in any of the aforementioned modes is always such that the mark state makes the receive minus terminal negative compared to he receive plus terminal. Connected with the receive plus terminal, through the conductor 11, is the first input terminal of a conventional diode bridge for polarizing the incoming telegraph signal. The bridge includes diodes 12, 13, 14 and 15.

The second input of the diode bridge is connected with the receive minus input terminal through the conductor 10. The diode bridge is conventionally configured with front-to-back diode connections at the two input terminals. The positive output of the bridge is taken from the forward connection point of the diodes 13, 15, and the negative output of the bridge is taken from the rear connection point of the diodes 12, 14.

The positive output of the bridge is carried by a conductor 16 which is connected with the collector of a first transistor, T1, of the NPN-type. The negative output of the bridge is carried by a conductor 17 which is connected with the emitter of the transistor T1. The base of the transistor is connected through a zener diode 18, in the conventional breakdown direction, with the collector of T1, so that the collector is always at a constant voltage above the base. The emitter of the transistor is connected with the base through an emitter-biasing resistor 19. A capacitor 20 connected with the conductors 16, 17 is provided across the transistor T1.

When a mark signal is received, the receive minus terminal is at a lower voltage than the receive plus terminal. The diodes 13 and 14 conduct so that the voltage at the conductor 16 is above the voltage at the conductor 17. When a space signal is received, the receive minus terminal is at a higher voltage than the receive plus terminal so that the diodes 12 and 15 conduct resulting again in a voltage at the conductor 16 above the voltage at the conductor 17.

The transistor T1, the zener diode 18, the resistor 19 and the capacitor 20, cooperate to regulate the voltage across the conductors 16–17 maintaining it at a predetermined constant level when telegraph data is being received. The resistor 19 is selected to provide a small bias base-to-emitter voltage of the transistor T1 which is in the normal forward-bias direction, i.e., the base voltage being slightly higher than the emitter voltage. When the line input voltage across the conductors 10, 11 is varied upwardly the emitter-to-base voltage increases causing the collector current to increase. This increased current causes only a negligible voltage increase between the base and emitter since the base-to-emitter resistance is negligible compared to the collector-to-base resistance. Thus, the current through T1 increases but the voltage across it, i.e., between conductors 16–17 remains basically constant. The current flow through the zener diode 18 varies with line voltage but the voltage across is also remains relatively constant. The capacitor 20 is included to provide a low-output impedance at high frequencies and to provide power to the circuit for a short time during no current line conditions, e.g., during the receipt of a spacing bit in unipolar operation.

It can be seen that the regulated voltage across the conductors 16–17 is maintained at a value very close to the avalanche or conventional breakdown voltage of the zener diode since the voltage across the resistor 19 is negligibly small. The transmitter, including the communication line, has a conventional source impedance ranging in the area of about 1,600 to 3,600 ohms. Thus, as the voltage between the conductors 16–17 is regulated by action of the transistor T1 and the zener diode, the current drain through the transistor is maintained at a reasonable level.

A good example can be seen in connection with 120-volt bipolar operation in which the transmitter source impedance is about 3,400 ohms. A 12-volt zener diode 18 is selected to provide a regulated voltage in the area of about 12 volts. A transistor, T1, of the type 2N2270, is used in connection with a resistor, 19, of 2.4kΩ. During both mark and space signals the current passing into this circuit is about 35 ma. of which about 19 ma. are bled off through the transistor, T1, leaving a balance of about 16 ma. to drive the output bipolar relay described below. The preferred value of the capacitor 20 is about 150 microfarads.

During the transmission of both mark and space signals this circuit configuration results in a regulated voltage of about 12 volts between the conductors 16–17, the voltage at 16 always being higher. An important advantage of this circuit configuration is that the same regulated voltage is obtained no matter which of the aforementioned line voltages or operating modes are used.

To drive the output relay a regenerative bistable circuit is provided which is similar to a Schmitt trigger. This circuit includes two transistors, T2 and T3, symmetrically arranged having a common emitter resistor such that when the first transistor conducts the second does not, and when the second transistor conducts the first does not. Both transistors are of the PNP-type. The base of the transistor T2 is connected through a resistor 21 with the conductor 10 which senses the receive minus signal. A resistor 22 is provided which is connected at one end with the conductor 16 carrying the regulated positive voltage and at the other end connected directly to the base of transistor T2. A common emitter resistor 23, is provided, connected at one end with the conductor 16 and connected at the other end to the emitters of transistors T2 and T3. Also connected with the conductor 16 is a resistor 24 which is connected with the base of the transistor T3. The base of the transistor T3 is coupled to the collector of the transistor T2 through a resistor 25.

A magnetic latching bipolar relay 30, is provided, having two energizing coils. The first coil is connected between terminals 31 and 32. The second coil is connected between terminals 33 and 34. The relay 30 is of the double-throw-type such that when its first coil is energized it provides a contact closure across its output conductors 36, 37. The conductor 37 is a common conductor. When the second coil of the relay is energized an output contact closure is provided across conductors 37, 38.

The resistors 21, 22, 23, 24, and 25 are selected to provide regenerative bistable operation of the transistors T2, T3 such that when T2 conducts, T3 does not conduct and vice versa. The resistors 24 and 25 are respectively chosen equal to the resistors 22 and 21 for symmetrical operation.

The resistors 21, 22, and 23 operate as a voltage-divider circuit to provide a bias voltage at the base of T2 slightly lower than the emitter voltage when the input signal is in the marking state. The marking input causes the 12-volt regulated voltage to appear across points A and B shown in the drawing, the voltage at A being higher. At this time the voltage at the base of T2 is substantially lower than at its emitter, therefore, T2 is caused to conduct. When T2 conducts, the base of the transistor T3 will be at a higher voltage than the emitter of T3 so that T3 stays cut off as long as the transistor T2 conducts, i.e., while the input signal is in the marking state. As T2 conducts its collector current passes through the first coil of the relay 30 via the terminals 31–32 passing through terminal 33 to the negative side of the voltage regulator circuit. The relay 30 is configured to move its armature to the marking state as shown in the drawing when its first coil is thus energized.

When the received signal changes to the spacing state, the regulated voltage appears across the points B–C shown on the drawing, the voltage at B being higher. This causes the voltage at the base of T2 to approach its emitter voltage. At this base voltage increases, T2 begins to cut off. As it does so, its collector voltage goes further negative approaching the voltage at point C as the current through the first coil of the relay 30 drops toward zero. As T2 proceeds to cut off, its emitter voltage tends to drop. As the collector of T2 proceeds negatively, and its emitter proceeds positively, a point is reached whereby the voltage divider formed by the resistors 24 and 25 causes the base voltage of T3 to drop below its emitter voltage, thus tending to turn T3 into conduction. As T3 begins to conduct it causes the emitter voltage of T2 to drop further negative which tends to turn T2 further off, which in turn tends to turn T3 further on until T3 is fully conducting and T2 is fully off. The transistor T3 stays conducting as long as the received signal is in the spacing state. The collector current of T3 passes through the second coil of the relay 30 through its terminals 34–33 to the negative side of the voltage regulator circuit. When the second coil is thus energized, the relay provides an output closure across its spacing output terminals 38–37.

When a marking signal is again received, the regulated voltage again appears across the points A–B. This causes the voltage at the emitter of T2 to rise above its base voltage so that T2 begins to conduct. At this point, the voltage at the collector of T2 increases which in turn causes the voltage at the base of T3 to increase above its emitter voltage tending to cut off the transistor T3. As the transistor T2 conducts further, it causes the voltage at the emitter of T3 to drop further negative with respect to the base of T3. This tends to further cut off T3 which in turn tends to turn T2 further on until T2 is fully conducting and T3 is fully off. The output relay 30 is accordingly energized to the marking state. This relay includes a magnetic latching feature which permits it to hold the last state received. However, it should be noted that when an open line signal is received the relay will automatically move to spacing due to the gradual discharge of the capacitor 20 through the bistable circuit. Then the relay will magnetically latch in the spacing state until a mark is received. The capacitor 20 similarly causes the relay to move to spacing when a spacing bit is received in unipolar operation.

The great flexibility of the circuit of the present invention can be further understood by an example of its operation in the unipolar mode at 24 volts. In this mode, the mark signal is received as a negative 24-volt condition on the receive minus terminal while the receive plus terminal is at zero. The space signal is received as 0 volt between these terminals. During marking, the diodes 13, 14 conduct, as discussed above, causing the zener diode 18 to conduct. The fixed 12-volt collector-to-base voltage at the transistor T1 is thus established and T1 bleeds excess current, as described above, to provide the regulated voltage of approximately 12 volts between the conductors 16–17. The marking signal results in the 12 volts appearing across the points A–B which causes the transistor T2 to conduct and T3 to be cut off in the manner described above, thereby establishing the marking state in the relay 30. When a spacing signal is received there is no voltage between the input terminals so that T2 is cut off and T3 conducts, by discharge of the capacitor 20, long enough to move the relay 30 to the spacing state.

It can be seen from the foregoing that by using the regenerative bistable circuit in conjunction with the voltage-regulating circuit the output relay is always protected from the transmission line conditions, being subjected only to the regulated power, while the bistable circuit in the configuration described is reliably responsive to the state of the transmitted signals.

While the invention has been described with a certain degree of particularity, it can, nevertheless, be seen by the examples and descriptions hereinabove set forth that many modifications and variations of the invention may be made without departing from the spirit and scope thereof.

I claim:

1. A relay system for receiving a binary signal carried by a communication line, wherein one state of said binary signal is manifested by a line voltage greater than the line voltage associated with the other state of said binary signal, said relay system being for the purpose of converting said states of said binary signal to corresponding states of at least one output circuit thereof, comprising in combination:

a. means including an output relay having an energizing coil and at least one set of output contacts for defining an output circuit capable of assuming two states, the first state by a closed condition of said contacts, the second state by an open condition of said contacts;

b. means including voltage-regulating circuit coupled with said communication line for providing a regulated voltage from said received binary signal, said voltage not exceeding a predetermined value safe for the operation of said relay; and c. means including a bistable circuit having one input connected with said voltage regulating means (b), an output coupled with said energizing coil of said relay (a) for applying current to said coil from said voltage-regulating means, and a trigger input coupled with said communication line sensing the state of said binary signal, for triggering said bistable circuit to apply said current to said energizing coil to provide said first state of said relay contacts when said binary signal is in its first state and for deenergizing said coil to provide said second state of said relay contacts when said binary signal is in its second state.

2. A relay system for receiving a binary signal in bipolar form carried by a communication line and for converting the two states capable of being assumed by said binary signal into corresponding states of at least one output circuit of said relay system, comprising in combination:

a. means including a polarizing bridge circuit connected with said communication line for receiving said bipolar binary signal and for providing a polarized signal therefrom;

b. an output relay having an energizing coil and at least one set of output contacts for defining an output circuit capable of assuming two states, the first state by a closed condition of said contacts, the second state by an open condition of said contacts;

c. means including a voltage-regulating circuit, connected with said means (a), for providing a regulated voltage from said polarized signal, said voltage not exceeding a predetermined value safe for the operation of said relay; and d. means including a bistable circuit having one input connected with said voltage-regulating means (c), an output coupled with said energizing coil of said relay (b) for applying current to said coil from said voltage-regulating means, and a trigger input coupled with said communication line sensing the state of said binary signal, for triggering said bistable circuit to apply said current to said energizing coil to provide said first state of said relay contacts when said binary signal is in its first state and for deenergizing said coil to provide said second state of said relay contacts when said binary signal is in its second state.

3. The apparatus of claim 2 wherein said voltage-regulating circuit includes a transistor coupled with said polarizing bridge and a zener diode coupled with said transistor to control the voltage across said transistor at a value substantially equal to said predetermined value.

4. The apparatus of claim 3 wherein said transistor is of the NPN-type, wherein said zener diode has an avalanche voltage rating substantially equal to said predetermined voltage and is connected directly across the collector and base of said transistor to provide a fixed voltage of the collector above the base, and wherein said voltage-regulating circuit further includes a bias resistor connected across the base and emitter of said transistor to bias said transistor into conduction for providing said predetermined voltage across said transistor from its collector to emitter.

5. The apparatus of claim 2 wherein said bistable circuit of said means (d) comprises a regenerative bistable circuit wherein said trigger input thereof is connected directly to said communication line for sensing the state of said binary signal, and wherein said output thereof is connected directly with said energizing coil of said relay to apply said current to said coil.

6. The apparatus of claim 5 wherein said output relay includes two sets of output contacts respectively defining first and second output circuits which, in turn, are respectively associated with said first and second states of said binary signal, wherein said relay includes first and second energizing coils for respectively closing said contacts of said first and second output circuits, wherein said regenerative bistable circuit includes two regeneratively coupled transistors the output of the first connected directly with said first energizing coil and the output of the second transistor connected directly with said second energizing coil, whereby when said received binary signal is in its first binary state said first transistor is triggered into conduction causing said first output circuit contacts to close while said second output circuit contacts remain open thereby representing the first state of said received binary signal, and when said received signal is in its second state said second transistor is triggered into conduction causing said second output circuit contacts to close while said first output circuit contacts are caused to remain open thereby representing the second state of said received signal.

7. A relay system for receiving a binary signal in bipolar form carried by a communication line and for converting the two states capable of being assumed by said binary signal into corresponding states of the output of said relay system, comprising in combination:

a. means including a polarizing bridge circuit connected with said communication line for receiving said bipolar binary signal and for providing a polarized signal therefrom;
b. an output relay including two sets of output contacts for defining first and second output circuits and first and second energizing coils for respectively closing said contacts when said coils are respectively energized;
c. a voltage-regulating circuit connected with said polarizing bridge circuit for providing a regulated voltage from said polarized signal not exceeding a predetermined value safe for the operation of said relay, said regulating circuit including an NPN-transistor connected across the output of said polarizing bridge circuit and a zener diode having an avalanche voltage substantially equal to said predetermined value connected across the collector and base of said transistor to provide said avalanche voltage of the collector above the base causing said transistor to conduct, thereby providing said regulated voltage of the output of said regulating circuit across said transistor; and
d. a regenerative bistable circuit including first and second regeneratively coupled transistors, a first input connection with said regulating circuit (c) for receiving current therefrom, a trigger input connection coupled with said communication line for triggering said first transistor into conduction and said second transistor into a cutoff condition when said received binary signal is in its first state and for triggering said second transistor into conduction and said first transistor into a cutoff condition when said received binary signal is in its second state, a first driven connection coupling said first transistor with said first energizing coil of said relay (b) for energizing said first coil when said first transistor is conducting, and a second driven connection coupling said second transistor with said second energizing coil for energizing said second coil when said second transistor is conducting.

* * * * *